(12) United States Patent
Furukawa et al.

(10) Patent No.: US 9,279,667 B2
(45) Date of Patent: Mar. 8, 2016

(54) ASPHERIC SURFACE MEASURING METHOD, ASPHERIC SURFACE MEASURING APPARATUS, OPTICAL ELEMENT PRODUCING APPARATUS AND OPTICAL ELEMENT

(71) Applicant: CANON KABUSHIKI KAISHA, Tokyo (JP)

(72) Inventors: Yasunori Furukawa, Utsunomiya (JP); Yumiko Osaki, Utsunomiya (JP); Yoshiki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 357 days.

(21) Appl. No.: 13/790,558

(22) Filed: Mar. 8, 2013

(65) Prior Publication Data

US 2013/0235472 A1    Sep. 12, 2013

(30) Foreign Application Priority Data

Mar. 9, 2012    (JP) .................................. 2012-052422

(51) Int. Cl.
*G01B 11/24*    (2006.01)
*G02B 13/18*    (2006.01)
(Continued)

(52) U.S. Cl.
CPC .............. *G01B 11/24* (2013.01); *G01M 11/005* (2013.01); *G01M 11/0271* (2013.01); *G02B 13/18* (2013.01)

(58) Field of Classification Search
USPC .......... 356/601–612, 512–516; 359/708–710, 359/718, 642–643, 664
See application file for complete search history.

(56) References Cited

U.S. PATENT DOCUMENTS 6,100,980 A    8/2000 Ichikawa
6,449,049 B1    9/2002 Lam et al.
(Continued)

FOREIGN PATENT DOCUMENTS

JP    9329427 A    12/1997
JP    10281736 A    10/1998
(Continued)

OTHER PUBLICATIONS

Notice of Allowance dated Sep. 30, 2014 issued in related U.S. Appl. No. 13/789,872.

(Continued)

*Primary Examiner* — Tri T Ton
(74) *Attorney, Agent, or Firm* — Rossi, Kimms & McDowell LLP

(57) ABSTRACT

The method includes: calculating positional and angular magnification distributions of rays reflected by a reference aspheric surface on a light-receiving sensor and on a sensor conjugate surface; measuring a first wavefront of a reference light on the sensor; and calculating a second wavefront of the reference light on the sensor based on a parameter of an optical system. The method includes: moving at least two movable elements for calibration such that a difference between rotationally symmetric components of the first and second wavefronts becomes small; measuring, after the calibration, a third wavefront of the reference light on the sensor; measuring, after the calibration, a fourth wavefront of the measurement light on the sensor; and calculating the profile of the measurement object aspheric surface by using the third and fourth wavefronts, the positional and angular magnification distributions, and the profile of the reference aspheric surface.

7 Claims, 5 Drawing Sheets

(51) Int. Cl.
*G01M 11/02* (2006.01)
*G01M 11/00* (2006.01)

(56) References Cited

U.S. PATENT DOCUMENTS

| | | |
|---|---|---|
| 7,106,455 B2 | 9/2006 | Suzuki et al. |
| 7,612,893 B2 | 11/2009 | Kuchel |
| 8,526,009 B2 | 9/2013 | Ueki |
| 2002/0056815 A1 | 5/2002 | Mann et al. |
| 2003/0103215 A1 | 6/2003 | Kuchel |
| 2003/0117632 A1 | 6/2003 | Golini et al. |
| 2003/0215053 A1 | 11/2003 | Ichihara |
| 2010/0110446 A1 | 5/2010 | Kuchel |
| 2010/0177322 A1 | 7/2010 | Nakauchi |
| 2013/0235477 A1 | 9/2013 | Furukawa |
| 2013/0235478 A1 | 9/2013 | Maeda |

FOREIGN PATENT DOCUMENTS

| | | |
|---|---|---|
| JP | 2000097663 A | 4/2000 |
| JP | 2003050109 A | 2/2003 |
| JP | 2004125768 A | 4/2004 |
| JP | 2006133059 A | 5/2006 |
| JP | 3971747 B | 9/2007 |
| JP | 2009180554 A | 8/2009 |
| WO | 03006920 A1 | 1/2003 |

OTHER PUBLICATIONS

Notice of Allowance dated Oct. 1, 2014 issued in related U.S. Appl. No. 13/789,921.

Office Action issued in corresponding German Patent Application No. 10 2013 203 883.6, dated Feb. 2, 2015. English translation provided.

Carvalho et al., "A software simmulation of Hartmann-Schack patterns for real corneas", Adaptive optics—from telescopes to the human eye, International Symposium, Nov. 13-14, 2000 Murcia, Spain.

Johannes Pfund, et al. "Nonnull Testing of Rotationally Symmetric Aspheres: A Systematic Error Assessment" Applied Optics, Feb. 1, 2001. vol. 40, No. 4.

ASPHERIC SURFACE MEASURING METHOD, ASPHERIC SURFACE MEASURING APPARATUS, OPTICAL ELEMENT PRODUCING APPARATUS AND OPTICAL ELEMENT

BACKGROUND OF THE INVENTION

1. Field of the Invention

The present invention relates to a technology for measuring aspheric surface profile of an optical element such as an aspheric lens.

2. Description of the Related Art

As a non-contact measuring method for fast measuring aspheric surface profile of an aspheric lens, a method has been proposed in Jahannes Pfund, Norbert Lindlein and Johannes Schwider, "NonNull testing of rotationally symmetric aspheres: a systematic error assessment" (App. Opt. 40 (2001) p. 439), which projects light having a spherical wavefront onto an aspheric surface as a measurement object surface through an optical system and measures a measurement light reflected by the measurement object surface by using a Shack-Hartmann sensor provided as a light-receiving sensor. This measuring method has an advantage of being able to measure profiles of various designed measurement object surfaces, as compared with an interferometer using a null lens disclosed in Japanese Patent Laid-Open No. 9-329427. Moreover, this measuring method also has an advantage that, as compared with a stitching interferometer disclosed in Japanese Patent Laid-Open No. 2004-125768 which moves a sample during measurement and a scanning interferometer disclosed in Japanese Patent No. 3971747, there is no need to use a stage and a length measuring device for moving the sample with high accuracy, and a complex analysis program.

In the method using the Shack-Hartmann sensor, proposed in Jahannes Pfund, Norbert Lindlein and Johannes Schwider, "NonNull testing of rotationally symmetric aspheres: a systematic error assessment" (App. Opt. 40 (2001) p. 439), the measurement object surface does not reflect the measurement light perpendicularly thereto and therefore a ray angle of the reflected measurement light from the measurement object surface is different from a ray angle of the measurement light reaching the measurement object surface. Consequently, the reflected measurement light entering the light-receiving sensor is not collimated, which is detected as a wavefront significantly different from a planer wavefront. Thus, the wavefront of the measurement light reflected by the measurement object surface, measured by the light-receiving sensor, does not directly show the profile of the measurement object surface, unlike a Fizeau interferometer.

Calculation of the profile of the measurement object surface from the measured wavefront requires a positional magnification (so-called distortion) that is a ratio of lateral coordinates of the sensor (sensor surface) and the measurement object surface, and an angular magnification that is a ratio of ray angles on the sensor surface and on the measurement object surface.

However, these positional magnification and angular magnification are not constant with respect to distance from an optical axis, that is, have distribution. The distribution changes sensitively, especially to error of curvature radius of a lens included in the optical system, error of position in an optical axis direction (so-called alignment error), spherical aberration and others. Therefore, calibration for the distribution is needed. Japanese Patent Laid-Open Nos. 2000-97663, 10-281736, 2006-133059 and 2009-180554 disclose calibration methods for the positional magnification distribution.

The calibration method disclosed in Japanese Patent Laid-Open Nos. 2000-97663, 10-281736 and 2006-133059 performs calibration of the positional magnification distribution by moving a measurement object surface by a known distance and detecting a change amount of a measured value by a light-receiving sensor with respect to the movement of the measurement object surface. Thus, the method not only requires a stage for moving the measurement object surface with high accuracy and a length measurement device for measuring the movement distance with high accuracy, but also has difficulty in accurate calibration of both the positional and angular magnification distributions.

Moreover, the calibration method disclosed in Japanese Patent Laid-Open No. 2009-180554 performs calibration of the positional magnification distribution by moving part of an optical system of an interferometer. However, the method performs the calibration by using radii of interference fringes on a light-receiving portion as an indicator, which has a problem that cannot accurately measure the radii of the interference fringes because their pitch is too small. Furthermore, the method has difficulty in accurate calibration of the angular magnification distribution.

SUMMARY OF THE INVENTION

The present invention provides an aspheric surface measuring method, an aspheric surface measuring apparatus and an optical element producing apparatus capable of easily performing calibration of a positional magnification distribution and an angular magnification distribution even if the magnification distributions are different from calculated (designed) ones due to error of its optical system.

The present invention provides as one aspect thereof an aspheric surface measuring method for measuring profile of a measurement object aspheric surface by using output from a light-receiving sensor to which a measurement light projected onto and reflected by the measurement object aspheric surface is introduced through an optical system. The method includes a step of providing a reference aspheric surface whose profile has been measured, a step of calculating a positional magnification distribution showing a positional relationship of rays of a reference light, which is projected onto and reflected by the reference aspheric surface and is introduced to the light-receiving sensor through the optical system, between positions on the light-receiving sensor and on a sensor conjugate surface having a conjugate relationship with the light-receiving sensor provided by the optical system and an angular magnification distribution showing an angular relationship of the rays of the reference light between angles on the light-receiving sensor and on the sensor conjugate surface, a step of measuring a first wavefront of the reference light on the light-receiving sensor by using the output from the light-receiving sensor, a step of calculating a second wavefront of the reference light on the light-receiving sensor by using a parameter of the optical system, a calibration step of moving at least two movable elements among part of the optical system, the reference aspheric surface and the light-receiving sensor such that a difference between rotationally symmetric components of the first and second wavefronts becomes smaller than a predetermined value, a step of measuring, after the calibration step, a third wavefront of the reference light on the light-receiving sensor by using the output from the light receiving sensor, a step of measuring, after the calibration step, a fourth wavefront of the measurement light on the light-receiving sensor by using the output from the light receiving sensor, and a step of calculating the profile of the measurement object aspheric surface by using the third wavefront, the fourth wavefront, the positional magnification distribution, the angular magnification distribution and the profile of the reference aspheric surface.

The present invention provides as another aspect thereof an aspheric surface measuring method for measuring profile of a measurement object aspheric surface by using output from a light-receiving sensor to which a measurement light projected onto and reflected by the measurement object aspheric surface is introduced through an optical system. The method includes a step of providing a reference aspheric surface whose profile has been measured, a step of measuring a first wavefront of a reference light, which is projected onto and reflected by the reference aspheric surface and is introduced to the light-receiving sensor through the optical system, on the light-receiving sensor by using the output from the light receiving sensor, a step of calculating a second wavefront of the reference light on the light-receiving sensor by using a parameter of the optical system, a calibration step of moving at least two movable elements among part of the optical system, the reference aspheric surface and the light-receiving sensor such that a difference between rotationally symmetric components of the first and second wavefronts becomes smaller than a predetermined value, a step of measuring, after the calibration step, a third wavefront of the reference light on the light-receiving sensor by using the output from the light receiving sensor, a step of measuring, after the calibration step, a fourth wavefront of the measurement light on the light-receiving sensor by using the output from the light receiving sensor, and a step of calculating a difference of the profiles of the measurement object and reference aspheric surfaces by ray tracing calculation using the third wavefront, the fourth wavefront and the parameter of the optical system.

The present invention provides as still another aspect thereof an aspheric surface measuring apparatus configured to measure profile of a measurement object aspheric surface by using output from a light-receiving sensor to which a measurement light projected onto and reflected by the measurement object aspheric surface is introduced through an optical system. The apparatus includes a magnification distribution calculating device configured to calculate, by using a reference aspheric surface whose profile has been measured, a positional magnification distribution showing a positional relationship of rays of a reference light, which is projected onto and reflected by the reference aspheric surface and is introduced to the light-receiving sensor through the optical system, between positions on the light-receiving sensor and on a sensor conjugate surface having a conjugate relationship with the light-receiving sensor provided by the optical system and an angular magnification distribution showing an angular relationship of the rays of the reference light between angles on the light-receiving sensor and on the sensor conjugate surface, a wavefront measuring device configured to measure a first wavefront of the reference light on the light-receiving sensor by using the output from the light receiving sensor, a wavefront calculating device configured to calculate a second wavefront of the reference light on the light-receiving sensor by using a parameter of the optical system, and a calibrating device configured to perform a calibration process to move at least two movable elements among part of the optical system, the reference aspheric surface and the light-receiving sensor such that a difference between rotationally symmetric components of the first and second wavefronts becomes smaller than a predetermined value. The wavefront measuring device is configured to measure, after the calibration process, by using the output from the light receiving sensor, a third wavefront of the reference light on the light-receiving sensor and a fourth wavefront of the measurement light on the light-receiving sensor. The apparatus further includes a profile calculating device configured to calculate the profile of the measurement object aspheric surface by using the third wavefront, the fourth wavefront, the positional magnification distribution, the angular magnification distribution and the profile of the reference aspheric surface.

The present invention provides as yet still another aspect thereof an aspheric surface measuring apparatus configured to measure profile of a measurement object aspheric surface by using output from a light-receiving sensor to which a measurement light projected onto and reflected by the measurement object aspheric surface is introduced through an optical system. The apparatus includes a wavefront measuring device configured to measure, by using a reference aspheric surface whose profile has been measured and the output from the light receiving sensor, a first wavefront of a reference light, which is projected onto and reflected by the reference aspheric surface and is introduced to the light-receiving sensor through the optical system, on the light-receiving sensor, a wavefront calculating device configured to calculate a second wavefront of the reference light on the light-receiving sensor by using a parameter of the optical system, and a calibrating device configured to perform a calibration process to move at least two movable elements among part of the optical system, the reference aspheric surface and the light-receiving sensor such that a difference between rotationally symmetric components of the first and second wavefronts becomes smaller than a predetermined value. The wavefront measuring device is configured to measure, after the calibration process, by using the output from the light receiving sensor, a third wavefront of the reference light on the light-receiving sensor and a fourth wavefront of the measurement light on the light-receiving sensor. The apparatus further includes a profile calculating device configured to calculate a difference of the profiles of the measurement object and reference aspheric surfaces by ray tracing calculation using the third wavefront, the fourth wavefront and the parameter of the optical system.

The present invention provides as further another aspect thereof an optical element producing apparatus includes a shaping apparatus configured to shape an optical element, and the above-described measuring apparatus.

The present invention provides as yet further another aspect thereof an optical element produced by using the above optical element producing apparatus.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
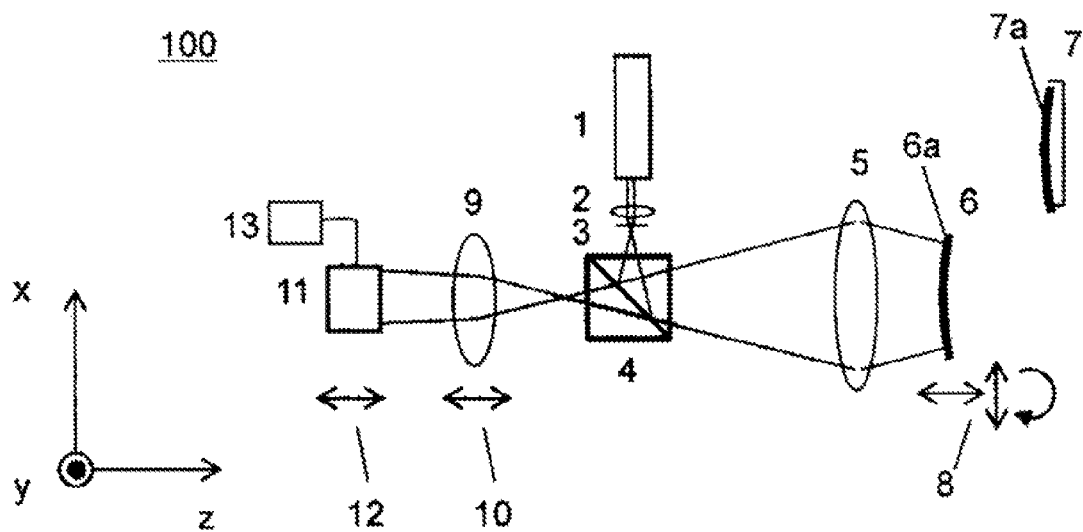
FIG. 1 schematically shows a configuration of an aspheric surface measuring apparatus using an aspheric surface measuring method that is Embodiment 1 of the present invention.

FIG. 1 shows a configuration of an aspheric surface measuring apparatus 100 configured to perform measurement by an aspheric surface measuring method that is a first embodiment (Embodiment 1) of the present invention. Description of position and movement of each of constituent elements will hereinafter be made on a basis of an x-y-z orthogonal coordinate system shown in FIG. 1.

In FIG. 1, reference numeral 1 denotes a light source, 2 a condenser lens, 3 a pinhole, 4 a half mirror and 5 a projecting lens. Reference numeral 6 denotes a reference lens whose one side surface is a reference aspheric surface (hereinafter simply referred to as "a reference surface") 6a serving as a measurement reference of profile (shape) of a measurement object aspheric surface described later. Reference numeral 7 denotes a measurement object lens as an object optical element whose one side surface is the measurement object aspheric surface (hereinafter simply referred to as "a measurement object surface") 7a as a surface to be measured.

Reference numeral 8 denotes an adjustment moving mechanism that moves the reference lens 6 and the measurement object lens 7 so as to adjust position and tilt (posture) of each of the reference lens 6 and the measurement object lens 7. Reference numeral 9 denotes an imaging lens, and 10 a lens moving mechanism that moves the imaging lens 9 in a direction (z-direction) in which an optical axis of a later described optical system (the direction is hereinafter referred to as an optical axis direction). Reference numeral 11 denotes a light-receiving sensor (hereinafter simply referred to as "a sensor"), and 12 a sensor moving mechanism that moves the sensor 11 in the optical axis direction. Reference numeral 13 denotes an analysis calculating device constituted by a computer and serving as a magnification distribution calculating device, a wavefront measuring device, a wavefront calculating device, a calibrating device and a profile calculating device.

Light (a reference light or a measurement light) from the light source 1 is condensed by the condenser lens 2 toward the pinhole 3. A spherical wave from the pinhole 3 is reflected by the half mirror 4, and then converted into convergent light by the projecting lens 5. The convergent light is reflected by the reference surface 6a or the measurement object surface 7a, and passes through the projecting lens 5, the half mirror 4 and the imaging lens 9 to enter the sensor 11. The projecting lens 5, the half mirror 4 and the imaging lens 9 constitute an optical system that introduces the light reflected by the reference surface 6a or the measurement object surface 7a to the sensor 11.

The light source 1 is constituted by a laser source or a laser diode and emits a monochrome laser light. The pinhole 3 is provided to produce a spherical wave having small aberration. Instead of the pinhole 3, a single mode fiber may be used.

The projecting lens 5 and the imaging lens 9 are respectively constituted by a plurality of lens elements. Focal length, curvature radius and diameter of each of the projecting lens 5 and the imaging lens 9 and magnification of combination of the projecting lens and the imaging lens 9 are decided on a basis of diameter (effective diameter) and curvature radius of the measurement object surface 7a and size (area) of a light-receiving surface of the sensor 11.

Moreover, the projecting lens 5 and the imaging lens 9 are designed such that a Petzval sum becomes negative, in order to dispose the measurement object surface 7a having a concave surface and a surface (hereinafter referred to as "a sensor conjugate surface") having a conjugate relationship with the sensor 11 provided by the optical system. Use of only one optical system limits a measurable aspheric profile range. Thus, this embodiment allows change (interchange) of at least one of the projecting lens 5 and imaging lens 9 depending on parameters (designed value) of the measurement object surface 7a such as effective diameter, curvature radius and aspheric amount.

The measurement object lens 7 is disposed at a position where the measurement object surface 7a coincides with the sensor conjugate surface on the optical axis. The coincidence of the measurement object surface 7a with the sensor conjugate surface avoids overlap of rays of light (measurement light) reflected by the measurement object surface 7a on the sensor 11, which enables accurate measurement of an angle distribution of the rays.

As mentioned above, the light as the convergent spherical wave is projected onto the measurement object surface 7a. A reflection angle of the light depends on the aspheric amount (in other words, a deviation amount from a spherical surface) and profile error; the reflection angle differs more widely from an incident angle to the measurement object surface 7a as the aspheric amount increases.

The reference lens 6 is a lens produced by using same parameters as those of the measurement object lens 7. Profile of the reference surface 6a is accurately measured by another apparatus than the measuring apparatus of this embodiment, such as a probe (sensing pin) type measuring apparatus, and data of the measured surface profile (hereinafter simply referred to as "measured profile") is stored in the analysis calculating device 13.

The sensor 11 is constituted by a microlens array including a lot of micro focusing lenses arranged in a matrix manner and an image sensor such as a CCD, which is generally called a Shack-Hartmann sensor. In the sensor 11, rays (light flux) passing through the microlens array are focused by each micro focusing lens on the image sensor.

The image sensor photoelectrically converts optical images formed by the rays from the respective micro focusing lenses to output electric signals. An incident angle $\Psi$ of the ray entering the image sensor is calculated from a detection result of a difference $\Delta p$ between position of a spot formed by the rays focused by the micro focusing lens and a pre-calibrated position such as a spot position when collimated rays enter the image sensor. The incident angle $\Psi$ and the spot position difference $\Delta p$ have the following relationship where f represents distance between the microlens array and the image sensor:

$$\Psi = a\tan(\Delta p/f).$$

Performing the above calculation on all the micro focusing lenses enables measurement of the angle distribution of the rays entering the sensor 11 (that is, the image sensor), by using the output from the sensor 11.

The sensor 11 is only necessary to measure a wavefront or an angle distribution of rays, so that other sensors than the Shack-Hartmann sensor may be used, such as a Hartmann plate, or one of a Shearing interferometer and a Talbot interferometer each constituted by a diffraction grating and an image sensor.

When size (diameter) of the rays received by the sensor 11 is larger than the area of the light-receiving surface of the sensor 11, a method may be employed which moves the sensor 11 in a plane (x-y plane) parallel to its light-receiving surface, measures the ray angle distribution at each of sensor movement positions, and then pieces together data of the ray angle distribution measured at the respective sensor movement positions.

In order to shape the measurement object surface 7a into a target profile, lateral coordinates at which correction shaping process on the measurement object surface 7a should be performed and a correction amount by the correction shaping process are calculated on a basis of difference of the data of the measured profile obtained by the measuring apparatus 100 from data of the target profile, and the correction shaping process is performed by a shaping part (shaping apparatus) of an optical element producing apparatus described later in Embodiment 5.

However, since a position distribution (lateral coordinates) of the measured ray angle distribution is a position distribution on the sensor 11, the correction shaping requires conversion of the position distribution of the measured ray angle distribution into coordinates on the measurement object surface 7a. In addition, since a difference of ray angles for the reference surface 6a and the measurement object surface 7a measured by the sensor 11 is different from a difference of ray reflection angles at the reference surface 6a and the measurement object surface 7a, conversion of the angle difference also should be performed.

Thus, this embodiment converts a ray position distribution and the ray angle distribution that are measured by the sensor 11 into a ray position distribution and a ray angle distribution on the sensor conjugate surface by using a positional magnification distribution and an angular magnification distribution described below. Then, this embodiment performs ray tracing calculation from the sensor conjugate surface, and thereby calculates a ray position distribution and a ray angle distribution on the measurement object surface 7a.

Next, description will be made of a sequence of a measurement process (aspheric measuring method) using the measuring apparatus 100 configured as above with reference to a flowchart shown in FIG. 2. This measurement process is executed by the analysis calculating device 13 constituted by a computer according to a computer program (analysis software).

The measurement process includes the following four steps: a preprocessing step A; a calibration step (calibration process) B; a measurement step C; and an analysis step D. This embodiment performs the calibration step by using the reference lens 6, the imaging lens 9 and the sensor 11.

Figure 3:
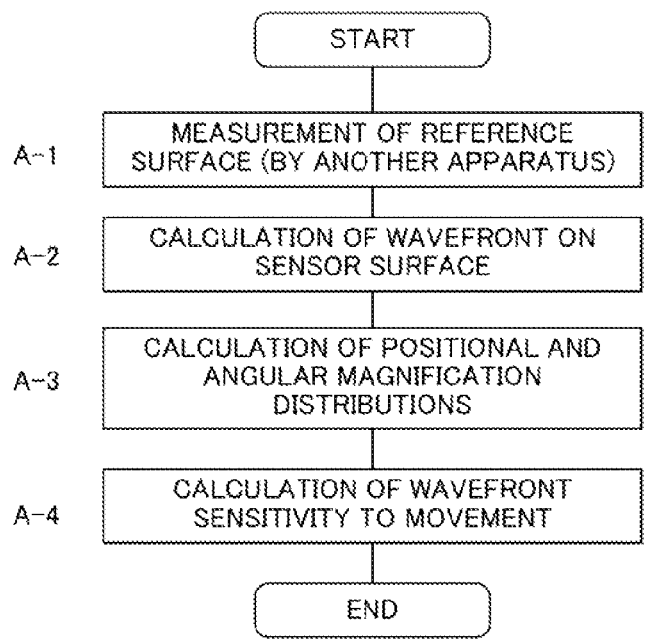
FIG. 3 is a flowchart showing a preprocessing step in Embodiment 1.

First of all, description will be made of the preprocessing step A with reference to a flowchart shown in FIG. 3.

At step A-1, the process measures profile (surface profile) of the reference surface 6a by using another measuring apparatus capable of measuring the profile of the reference surface 6a with high accuracy, such as the probe type measuring apparatus. Thus, the process provides the reference surface 6a whose profile has been measured.

At step A-2, the process calculates a wavefront W as a second wavefront on the light-receiving surface (hereinafter referred to as "a sensor surface") of the sensor 11 by using data of the measured profile of the reference surface 6a obtained by the measurement at step A-1 and the parameters of the optical system of this apparatus 100.

The parameters of the optical system include curvature radii of optical elements constituting the optical system, such as lenses and mirrors, refractive indices thereof and distances therebetween, which can be also called designed values (designed value data) of the optical system. Moreover, the parameters of the optical system may include information on wavefront aberration and the like.

When aberration and assembling error of the optical system and surface profiles of the lenses and mirrors are known or measurable, the process calculates the wavefront W by reflecting these values to the designed value of the optical system. The process may calculate the wavefront W by measuring temperature of a lens barrel that holds the optical system or the sensor 11, by calculating from the measured temperature an extended amount of the lens barrel, distances among the optical elements and a distance between the sensor 11 and the optical system, and by reflecting the calculated values to the designed value of the optical system. It is desirable that the wavefront W be expressed by a Zernike function that is an orthogonal function.

At step A-3, the process calculates a positional magnification distribution $\alpha$ and an angular magnification distribution $\beta$ between the sensor surface and the sensor conjugate surface, and calculates an incident ray angle $\eta$ to the reference surface 6a. The positional magnification distribution $\alpha$ shows a positional relationship of rays of light (reference light) reflected by the reference surface 6a between positions on the sensor surface and on the sensor conjugate surface. The angular magnification distribution $\beta$ shows an angular relationship of the rays reflected by the reference surface 6a between angles on the sensor surface and on the sensor conjugate surface.

Figure 4:
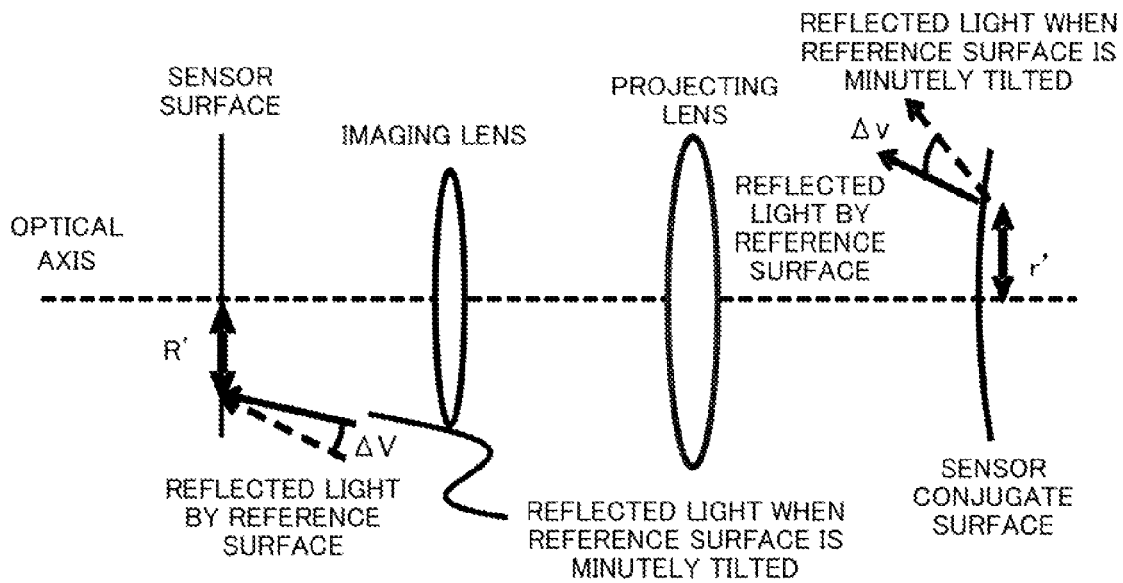
FIG. 4 shows ray position and angle.

Specifically, as shown in FIG. 4, when R' represents distance to an incident position of a ray on the sensor surface from the optical axis and r' represents distance to an incident position of the ray on the sensor conjugate surface from the optical axis, the positional magnification distribution $\alpha$ is expressed as follows:

$$r'/R'.$$

Moreover, when tilting of the reference surface 6a by a minute angle changes a ray reflection angle in a meridional plane on the sensor conjugate surface by $\Delta v$ and changes a ray reflection incident angle in a meridional plane on the sensor surface by $\Delta V$, the angular magnification distribution $\beta$ is expressed as follows:

$$\Delta V/\Delta v.$$

At step A-4, after changing positions of the reference lens 6, the imaging lens 9 and the sensor 11 in the optical axis direction (z-direction) from their designed values, the process calculates the wavefront W on the sensor surface, as well as at step A-2. Then, the process calculates, from a difference of the wavefronts W before and after the positional change (that is, movement) of the reference lens 6, the imaging lens 9 and the sensor 11, sensitivity of the wavefront (hereinafter referred to as "wavefront sensitivity") to the movement thereof in the optical axis direction, and stores it to the analysis calculating device 13. In this calculation, an evaluation area of the wavefront has a fixed center position and a fixed radius.

Figure 5:
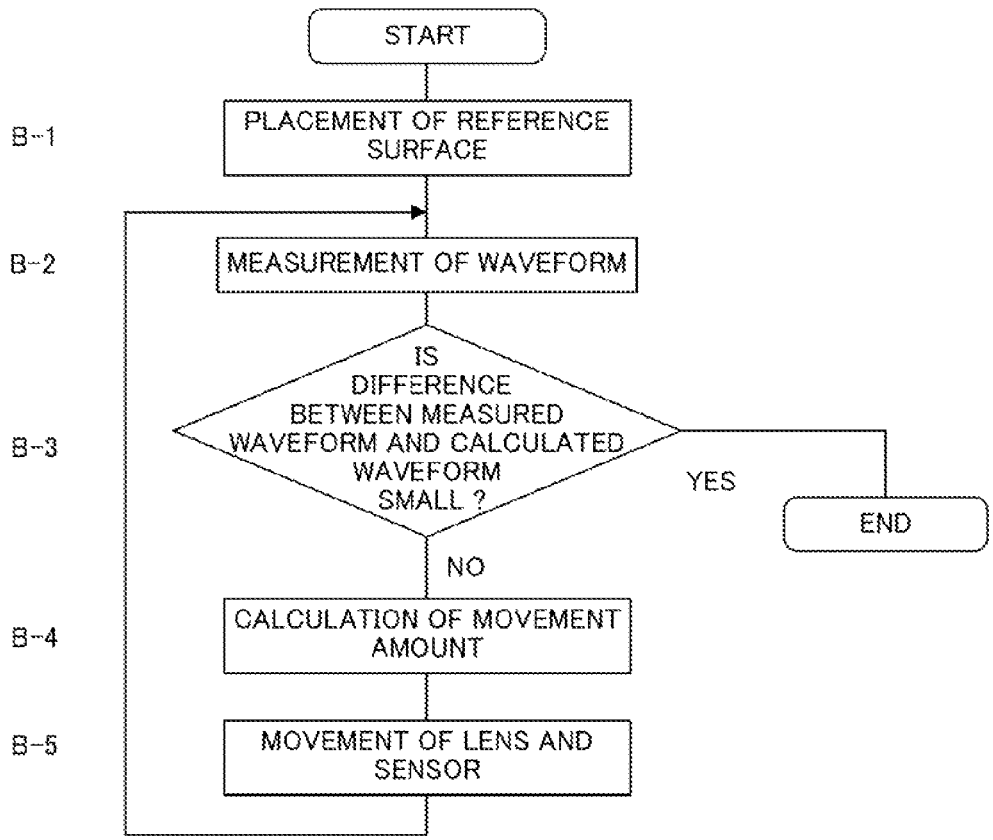
FIG. 5 is a flowchart showing a calibration step in Embodiment 1.

Next, description of the calibration step B will be made with reference to a flowchart shown in FIG. 5.

At step B-1, the process allows placement of the reference lens 6 having the reference surface 6a in the measuring apparatus 100.

At step B-2, the process measures, by the sensor 11, a wavefront as a first wavefront (hereinafter referred to as "a measured wavefront") of the rays reflected by the reference surface 6a.

At step B-3, the process calculates a difference between the measured wavefront obtained at step B-2 and the wavefront (hereinafter referred to as "a calculated wavefront") W obtained at step A-2, and determines whether or not the difference is smaller than a predetermined value, that is, whether or not the difference is sufficiently small. At this step, the process adjusts position of the reference lens 6 (that is, reference surface 6a) in the x-y plane orthogonal to the optical axis and tilt of the reference lens 6 with respect to the x-y plane, through the adjustment moving mechanism 8, such that differences between tilt components and between coma components of the measured wavefront and the calculated wavefront W become sufficiently small.

Moreover, the process adjusts the position of the reference surface 6a (that is, the reference lens 6) in the optical axis direction (z-direction) such that spherical components (rotationally symmetric components) of the measured wavefront and the calculated wavefront W, that is, spherical component terms (spherical terms) Z4, Z9, Z16, Z25, . . . , of the Zernike function have a (sufficiently) smaller difference than a predetermined value. However, when the optical system including the half mirror 4, the projecting lens 5 and the imaging lens 9 involves error, the difference of the spherical components of the wavefronts does not become sufficiently small just by the positional adjustment of the reference surface 6a in the optical axis direction.

Coincidence of the measured wavefront with the calculated wavefront W enables placement of the reference surface 6a to the position of the sensor conjugate surface, and results in that the positional magnification distribution α and the angular magnification distribution β of the measuring apparatus 100 coincide with the calculated positional magnification distribution and the calculated angular magnification distribution obtained at step A-3.

The calibration step B is performed at an initial alignment after assembly of the measuring apparatus 100, when a gap from the designed value increases due to the error of the optical system caused by environmental variation in air pressure, temperature, humidity and others, or when a measuring object (designed profile of the measurement object surface) is changed.

Thus, the process ends the calibration step B if the difference between the measured wavefront and the calculated wavefront W is sufficiently small, and then proceeds to step B-4.

At step B-4, the process calculates, from the wavefront sensitivity to the movement of the reference lens 6, the imaging lens 9 and the sensor 11 calculated at step A-4, movement amounts thereof such that a difference between the spherical components of the measured wavefront and the calculated wavefront W is smaller than the predetermined value (desirably, the difference becomes minimum). Specifically, the movement amounts are calculated as below.

When the differences of the wavefronts before and after the movements of the reference lens 6, the imaging lens 9 and the sensor 11 calculated at step A-4 are respectively represented by $\Delta W1$, $\Delta W2$ and $\Delta W3$, the differences $\Delta W1$, $\Delta W2$ and $\Delta W3$ are respectively expressed by the following expressions (1), (2) and (3). Moreover, when the difference between the measured wavefront obtained at step B-2 and the calculated wavefront W obtained at step A-2 is represented by $\Delta W$, the difference $\Delta W$ is expressed by the following expression (4).

$$\Delta W1 = a1 \times Z4 + a2 \times Z9 + a3 \times Z16 + \ldots \quad (1)$$

$$\Delta W2 = b1 \times Z4 + b2 \times Z9 + b3 \times Z16 + \ldots \quad (2)$$

$$\Delta W3 = c1 \times Z4 + c2 \times Z9 + c3 \times Z16 + \ldots \quad (3)$$

$$\Delta W = \Delta 1 \times Z4 + \Delta 2 \times Z9 + \Delta 3 \times Z16 + \ldots \quad (4)$$

In the above expressions, Z4, Z9 and Z16 represent the spherical terms of the Zernike function, which are expressed by the following expression (5) where h represents distance on the sensor 11 from the optical axis normalized by an analysis radius. Moreover, ai, bi, ci and $\Delta i$ (i=1, 2, 3, . . . ) represent coefficients of the Zernike function.

$$Z_{(n+1)^2} = \sum_{s=0}^{n} (-1)^s \frac{(2n-s)!}{s!(n-s)!^2} h^{2(n-s)} \quad (5)$$

$$(n = 1, 2, 3, \ldots )$$

Furthermore, when the difference between the measured wavefront obtained by the sensor 11 and the calculated wavefront W after moving the reference lens 6, the imaging lens 9 and the sensor 11 in the optical axis direction respectively by D1, D2 and D3 is represented by $\Delta W'$, the difference $\Delta W'$ is expressed by the following expression (6):

$$\Delta W' = (\Delta 1 - a1 \times D1 - b1 \times D2 - c1 \times D3) \times Z4 + \quad (6)$$
$$(\Delta 2 - a2 \times D1 - b2 \times D2 - c2 \times D3) \times Z9 +$$
$$(\Delta 3 - a3 \times D1 - b3 \times D2 - c3 \times D3) \times Z16 + \ldots$$

Minimizing of the difference $\Delta W'$ requires minimizing of a square sum Q of the coefficients of the respective terms of the Zernike function, shown by the following expression (7):

$$Q = (\Delta 1 - a1 \times D1 - b1 \times D2 - c1 \times D3)^2 + \quad (7)$$
$$(\Delta 2 - a2 \times D1 - b2 \times D2 - c2 \times D3)^2 +$$
$$(\Delta 3 - a3 \times D1 - b3 \times D2 - c3 \times D3)^2 + \ldots$$

A condition for minimizing the square sum Q is that each of values obtained by differentiating the square sum Q with respect to D1, D2 and D3 becomes zero. Therefore, calculation of D1, D2 and D3 satisfying the following expression (8) makes it possible to provide the movement amounts of the reference lens 6, the imaging lens 9 and the sensor 11.

$$dQ/dDi = 0 \; (i=1,2,3) \quad (8)$$

When calculating the movement amounts so as to minimizing the square sum Q of the coefficients of the spherical terms of the Zernike function as above, since sensitivity of the square sum Q to the movements of the reference lens 6, the imaging lens 9 and the sensor 11 becomes lower as an order of the spherical term becomes higher (that is, as n of Zn increases), a highest order of the spherical term using in the calculation may be appropriately limited. Depending on optical system configuration, it is often sufficient to minimize the square sum Q of the coefficients of 4th, 9th and 16th spherical terms of the Zernike function. Moreover, moving the reference lens 6, the imaging lens 9 and the sensor 11 can make the coefficients of Z4, Z9 and Z16 of the difference ΔW between the measured wavefront and the calculated wavefront W equal to zero.

Furthermore, the above calculation of the movement amounts uses the wavefront sensitivity calculated at step A-4. However, the calculation thereof may be made by using wavefront sensitivity calculated from a change amount of the measured wavefronts before and after the movements of the reference lens 6, the imaging lens 9 and the sensor 11 in the optical axis direction through the moving mechanisms 8, 10 and 12.

In addition, although this embodiment moves the three movable elements: the reference lens 6, the imaging lens 9 that constitutes part of the optical system and the sensor 11, all of them are not necessarily needed to be moved. That is, any two (at least two) of the three movable elements may be moved. Moreover, another element (for example, the projecting lens 5) than the reference lens 6, the imaging lens 9 and the sensor 11 may also be moved with the reference lens 6, the imaging lens 9 or the sensor 11. Furthermore, the movable element may be part (one or two or more) of a plurality of lens elements constituting the imaging lens 9 or the projecting lens 5.

Moreover, selecting, as the constituent element to be moved such as the reference lens 9, the imaging lens 9 and the sensor 11, one that provides a large wavefront change amount for its unit movement amount, that is, one that has high wavefront sensitivity enables decrease of the movement amount thereof.

Furthermore, as the constituent element to be moved, one may be selected which changes a frequency component of a difference between the rotationally symmetric components of the measured wavefront of the light reflected by the reference surface 6a before and after its movement, in other words, one may be selected which provides a near-linearly independent difference between the coefficients of each of Z4, Z9, Z16, . . . of the Zernike function before and after its movement. Such selection also enables decrease of the movement amount of the constituent element to be moved. In addition, designing part of the optical system such that it satisfies the above-mentioned condition for the constituent element to be moved in advance also enables decrease of its movement amount.

At step B-5, the process moves the reference lens 6, the imaging lens 9 and the sensor 11 in the optical axis direction by the movement amounts calculated at step B-4 through the moving mechanisms 8, and 12. Then, the process returns to step B-2 to perform the wavefront measurement (step B-2), the difference determination (step B-3), the movement amount calculation (step B-4) and the lens/sensor movement (step B-5) until the difference between the measured wavefront and the calculated wavefront W becomes sufficiently small.

Figure 6:
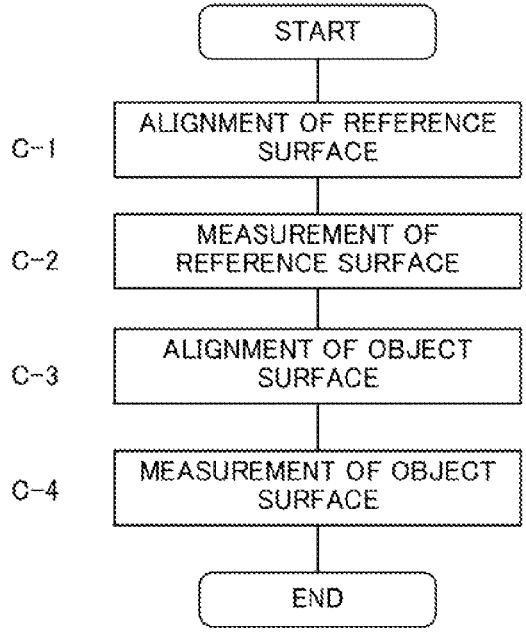
FIG. 6 is a flowchart showing a measurement step in Embodiment 1.

Next, description of the measurement step C will be made of a flowchart shown in FIG. 6. In the following description, the reference surface 6a after the above-described calibration step is referred to "a calibrated reference surface 6a".

At step C-1, the process adjusts the position and tilt of the reference lens 6 through the adjustment moving mechanism 8 as well as at step B-3.

At step C-2, the process measures a wavefront (third wavefront) of the light reflected by the calibrated reference surface 6a on the sensor surface, that is, a ray angle distribution V1, and stores data of the ray angle distribution V1 to the analysis calculating device 13.

At step C-3, the process allows removal of the reference lens 6 and placement of the measurement object lens 7. Then, the process adjusts the position and tilt of the measurement object lens 7 through the adjustment moving mechanism 8 so as to reduce a difference between the wavefront of the light reflected by the measurement object surface 7a of the measurement object lens 7 and the wavefront of the light reflected by the calibrated reference surface 6a in order to cause the measurement object surface 7a to coincide with the calibrated reference surface 6a as much as possible. At this step, position adjustment in the optical axis direction may be made by measuring center positions of the reference surface 6a and the measurement object surface 7a by using another (external) measuring apparatus such as a length measuring device or a displacement meter and by placing the measurement object surface 7a such that its center position coincides with the center position of the reference surface 6a.

At step C-4, the process measures a wavefront (fourth wavefront) of the light reflected by the measurement object surface 7a on the sensor surface, that is, a ray angle distribution V2, and stores data of the ray angle distribution V2 to the analysis calculating device 13.

Figure 7:
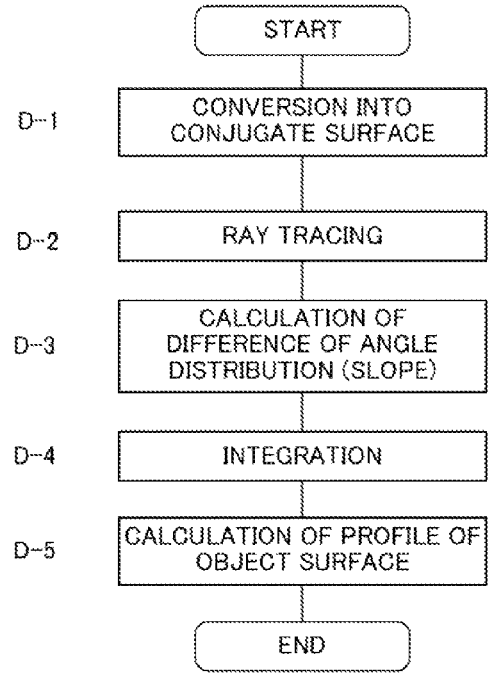
FIG. 7 is a flowchart showing an analysis step in Embodiment 1.

Next, description of the analysis step D will be made with reference to a flowchart shown in FIG. 7. In the analysis step, the process calculates profile (shape) of the measurement object surface 7a by using the ray angle distribution V1 corresponding to the wavefront (third wavefront) of the light reflected by the calibrated reference surface 6a on the sensor 11 (sensor surface) and the ray angle distribution V2 corresponding to the wavefront (fourth wavefront) of the light reflected by the measurement object surface 7a on the sensor 11 (sensor surface). In the calculation of the profile of the measurement object surface 7a, the process also uses the positional magnification distribution α, the angular magnification distribution β and the known (measured) profile of the reference surface 6a obtained at the preprocessing step.

At step D-1, the process divides the ray angle distributions V1 and V2 measured respectively for the reference surface 6a and the measurement object surface 7a by the angular magnification distribution β, as shown by the following expression (9), and adds a principal ray angle distribution η to a result of the division to calculate ray angle distributions v1 and v2 on the sensor conjugate surface. The principal ray angle distribution η is an incident angle distribution of rays reaching the reference surface 6a when performing the ray tracing calculation using the designed value and parallel to the optical axis (that is, at a ray angle of 0° with respect to the optical axis) from the sensor 11.

$$vi = Vi/\beta + \eta \quad (i=1,2) \tag{9}$$

Next, the process calculates a ray position distribution r on the sensor conjugate surface by multiplying a ray measurement position distribution Rc on the sensor 11 by the positional magnification distribution α, as shown by the following expression (10). The ray measurement position distribution Rc on the sensor 11 corresponds, when the sensor 11 is constituted by the Shack-Hartmann sensor, to center positions of the respective microlenses of the microlens array, shown as coordinates on the image sensor. The ray measurement position distribution Rc and the ray position distribution r on the sensor conjugate surface show distance from the optical axis, expressed by coordinates on the x-y plane.

$$r = \alpha \times Rc \tag{10}$$

Next, at step D-2, the process performs the ray tracing calculation based on the ray position distribution r on the sensor conjugate surface and the ray angle distributions v1 and v2 on the sensor conjugate surface for the reference surface 6a and the measurement object surface 7a to calculate intersection points rb1 and rb2 with the reference surface 6a. The intersection points rb1 and rb2 show distance from the optical axis, which are expressed by coordinates on the x-y plane.

At step D-3, the process calculates a ray angle distribution v2' on the measurement object surface 7a at the intersection point rb1 by performing interpolation calculation or the like on the ray angle distribution v2 on the measurement object surface 7a at the intersection point rb2. Then, the process calculates a difference Δs of slopes of the ray angle distribution v1 for the reference surface 6a and the ray angle distribution v2' for the measurement object surface 7a, as shown by the following expression (11):

$$\Delta s = \tan(v2') - \tan(v1) \tag{11}$$

Next, at step D-4, the process integrates the slope difference Δs. Since the slope difference Δs is a value obtained by differentiating the surface profile difference between the reference surface 6a and the measurement object surface 7a, integration of the slope difference Δs enables calculation of the surface profile difference between the reference surface 6a and the measurement object surface 7a. As algorithm of the integration, a method (modal method) can be employed which performs fitting on the slope difference by using a differential function of a basis function having samplings of the ray position rb1, and multiplies the basis function by coefficients obtained by the fitting.

And, a method (zonal method) can also be employed which adds the slope differences. These methods are described in W. H. Southwell, "Wave-front estimation from wave-front slope measurement" (J. Opt. Soc. Amr. 70, pp 998-1006, 1980).

At step D-5, the process adds data of the reference surface 6a measured at step A-1 to the surface profile difference obtained at step D-4 to calculate the profile of the measurement object surface 7a.

Figure 2:
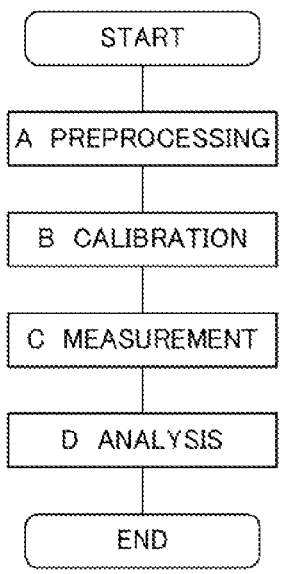
FIG. 2 is a flowchart showing the aspheric surface measuring method of Embodiment 1 (and of Embodiment 3).

Performing the measurement process of FIG. 2 described above enables non-contact fast measurement of the profile of the measurement object surface 7a with high accuracy even if the optical system involves any error.

Although this embodiment uses, as the measurement object surface, a surface of a lens, the measurement object surface may be surfaces of other objects such as a surface of a metal mold having a same surface profile as that of the lens surface.

Embodiment 2

Next, description will be made of an aspheric surface measuring apparatus configured to perform measurement by an aspheric surface measuring method that is a second embodiment (Embodiment 2) of the present invention. Although Embodiment 1 described the case of moving the three movable elements: the reference lens 6, the imaging lens 9 and the sensor 11 for the calibration, this embodiment moves only two movable elements: the reference lens 6 and the imaging lens 9 for the calibration. Not moving the sensor 11 enables reduction of one moving mechanism as compared with Embodiment 1, and makes calculation of movement amounts of the movable elements easier.

The aspheric surface measuring apparatus of this embodiment has a configuration corresponding to one in which the sensor moving mechanism 12 is removed from the configuration of the measuring apparatus 100 of Embodiment 1 shown in FIG. 1. Moreover, the aspheric surface measuring method of this embodiment is difference from the measuring method of Embodiment 1 in that the sensor 11 is not moved at step A-4 in the preprocessing step and in later-described steps B-4 and B-5 of the calibration step.

At step B-4, the process calculates, from the wavefront sensitivity to the movement of the reference lens 6 and the imaging lens 9 calculated at step A-4, movement amounts thereof such that a difference of spherical components (rotationally symmetric components) in a difference between the measured wavefront obtained at step B-2 and the calculated wavefront W obtained at step A-2 becomes minimum. A specific description thereof will be made below with expressions.

When differences of the wavefronts before and after the movement of the reference lens 6 and the imaging lens 9 calculated at step A-4 are respectively represented by ΔW1 and ΔW2, the differences ΔW1 and ΔW2 are expressed by the following expressions (12) and (13). Moreover, when the difference between the measured wavefront obtained at step B-2 and the calculated wavefront W obtained at step A-2 is represented by ΔW, the difference ΔW is expressed by the following expression (14).

$$\Delta W1 = a1 \times Z4 + a2 \times Z9 + a3 \times Z16 + \ldots \tag{12}$$

$$\Delta W2 = b1 \times Z4 + b2 \times Z9 + b3 \times Z16 + \ldots \tag{13}$$

$$\Delta W = \Delta 1 \times Z4 + \Delta 2 \times Z9 + \Delta 3 \times Z16 + \ldots \tag{14}$$

In the above expressions, ai, bi and Δi (i=1, 2, 3, ...) are coefficients of the Zernike function shown by the expression (5).

Furthermore, when the difference between the measured wavefront obtained by the sensor 11 and the calculated wavefront W after moving the reference lens 6 and the imaging lens 9 in the optical axis direction respectively by D1 and D2 is represented by ΔW', the difference W is expressed by the following expression (15):

$$\Delta W' = \tag{15}$$
$$(\Delta 1 - a1 \times D1 - b1 \times D2) \times Z4 + (\Delta 2 - a2 \times D1 - b2 \times D2) \times Z9 +$$
$$(\Delta 3 - a3 \times D1 - b3 \times D2) \times Z16 + \ldots$$

Minimizing of the difference ΔW' requires minimizing of a square sum Q of the coefficients of the respective terms of the Zernike function, shown by the following expression (16).

$$Q = (\Delta 1 - a1 \times D1 - b1 \times D2)^2 + \tag{16}$$
$$(\Delta 2 - a2 \times D1 - b2 \times D2)^2 + (\Delta 3 - a3 \times D1 - b3 \times D2)^2 + \ldots$$

A condition for minimizing the square sum Q is that each of values obtained by differentiating the square sum Q with respect to D1 and D2 becomes zero. Therefore, calculation of D1 and D2 satisfying the following expression (17) makes it possible to provide the movement amounts of the reference lens 6 and the imaging lens 9.

$$dQ/dDi = 0 \ (i=1,2) \tag{17}$$

When calculating the movement amounts so as to minimizing the square sum Q of the coefficients of the spherical terms of the Zernike function as above, since sensitivity of the square sum Q to the movements of the reference lens 6 and the imaging lens 9 becomes lower as an order of the spherical term becomes higher (that is, as n of Zn increases), a highest order of the spherical term using in the calculation may be appropriately limited. Thus, depending on optical system configuration, it is often sufficient to minimize the square sum Q of the coefficients of 4th, 9th and 16th spherical terms of the Zernike function.

Moreover, the movement amount may be calculated such that the 4th and 9th terms of the Zernike function become minimum (zero). This is effective for problem cases where, especially for the 16th or higher order terms of the Zernike function, the sensor 11 has low measurement accuracy or the wavefront sensitivity with respect to the movement of the reference lens 6 and the imaging lens 9 is low and thereby increasing error of the movement amount. In this calculation, the movement amounts D1 and D2 calculated by the following expression (19) need to satisfy a condition shown by the following expression (18).

$$\Delta 1 - a1 \times D1 - b1 \times D2 = 0$$

$$\Delta 2 - a2 \times D1 - b2 \times D2 = 0 \tag{18}$$

$$D1 = (b2 \times \Delta 1 - b1 \times \Delta 2)/(a1 \times b2 - a2 \times b1)$$

$$D2 = (-a2 \times \Delta 1 + a1 \times \Delta 2)/(a1 \times b2 - a2 \times b1) \tag{19}$$

The above calculation of the movement amounts uses the wavefront sensitivity calculated at step A-4. However, the calculation thereof may be made by using wavefront sensitivity calculated from a change amount of the measured wavefronts before and after the movements of the reference lens 6 and the imaging lens in the optical axis direction through the moving mechanisms 8 and 10.

Moreover, although this embodiment moves the reference lens 6 and the imaging lens 9, combination of the constituent elements to be moved are not limited thereto as long as the difference ΔW between the measured wavefront and the calculated wavefront W. For example, the reference lens 6 and the sensor 11 may be moved, or the imaging lens 9 and the sensor 11 may be moved. Furthermore, two of lens elements or lens groups constituting the reference lens 6 and the imaging lens 9 may be selected as the constituent elements to be moved, or two of lens elements or lens groups constituting the imaging lens 9 may be selected.

Selecting, as the constituent element to be moved, one that generates a large change amount of the wavefront for its unit movement amount (that is, one that provides high wavefront sensitivity to its movement) enables decrease of its movement amount.

In addition, as the constituent element to be moved, one may be selected which changes a frequency component of a difference between the rotationally symmetric components of the measured wavefront of the light reflected by the reference surface 6*a* before and after its movement, in other words, one may be selected which provides a near-linearly independent difference between the coefficients of Z4, Z9, Z16, . . . of the Zernike function before and after its movement. Such selection also enables decrease of the movement amount of the constituent element to be moved.

At step B-5, the process moves the reference lens 6 and the imaging lens 9 in the optical axis direction by the movement amounts calculated at step B-4 through the moving mechanisms 8 and 10. Then, the process returns to step B-2 to perform the wavefront measurement (step B-2), the difference determination (step B-3), the movement amount calculation (step B-4) and the lens movement (step B-5) until the difference between the measured wavefront and the calculated wavefront W becomes sufficiently small.

Embodiment 3

Next, description will be made of an aspheric surface measuring apparatus configured to perform measurement by an aspheric surface measuring method that is a third embodiment (Embodiment 3) of the present invention. As compared with Embodiments 1 and 2, this embodiment does not need step A-3 in the preprocessing step, and changes steps D-1 and D-2 in the analysis step to step D'-1+2 described below. The aspheric surface measuring apparatus of this embodiment has a same configuration as that of the aspheric surface measuring apparatus 100 of Embodiment 1 shown in FIG. 1 or the aspheric surface measuring apparatus of Embodiment 2.

At step D'-1+2, the process performs, after the calibration step, ray tracing calculation using the ray angle distributions (third and fourth wavefronts) V1 and V2 measured respectively for the reference surface 6*a* and the measurement object surface 7*a* and the designed values of the optical system to calculate intersection points rb1 and rb2 with the reference surface 6*a*. The process uses angle distributions obtained by the ray tracing calculation as a ray angle distribution v1 on the measurement object surface 7*a* at the intersection point rb1 and a ray angle distribution v2 on the measurement object surface 7*a* at the intersection point rb2.

This embodiment requires, as compared with Embodiments 1 and 2, a ray tracing software built in the apparatus and an interface between the ray tracing software and the analysis software. However, this embodiment does not use the positional magnification distribution α and the angular magnification distribution β unlike Embodiments 1 and 2, thereby making it possible to produce the analysis software more easily.

Embodiment 4

Figure 8:
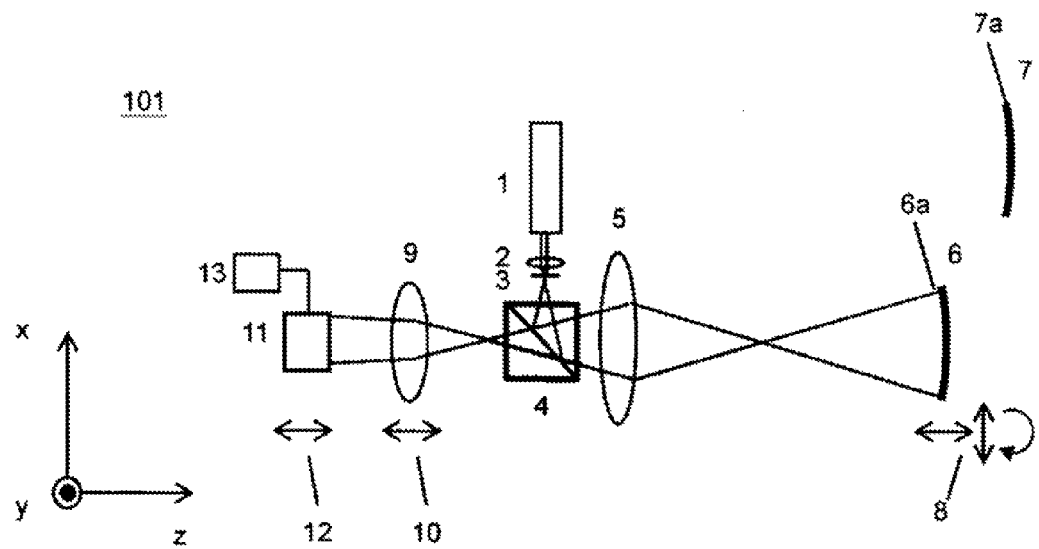
FIG. 8 schematically shows a configuration of an aspheric surface measuring apparatus using an aspheric surface measuring method that is Embodiment 4 of the present invention.

Description will be made of an aspheric surface measuring method applicable to a case where the measurement object surface is formed to have a concave aspheric shape. FIG. 8 shows a configuration of an aspheric surface measuring apparatus 101 performing measurement by the aspheric surface measuring method of this embodiment. Use of this measuring apparatus 101 enables the measurement of the measurement object surface as well as Embodiments 1, 2 and 3.

In FIG. 8, reference numeral 6' denotes a reference lens (concave aspheric lens) whose one side surface is a reference surface 6*a*'. Reference numeral 7' denotes a measurement object lens (concave aspheric lens) whose one side surface is the measurement object surface 7*a*'. Other components of the measuring apparatus 101 are same as those of the measuring apparatus 100 shown in FIG. 1.

Moreover, this embodiment performs a measurement process including a preprocessing step, a calibration step, a measurement step and an analysis step that are same as those in Embodiments 1 to 3.

Embodiment 5

Figure 9:
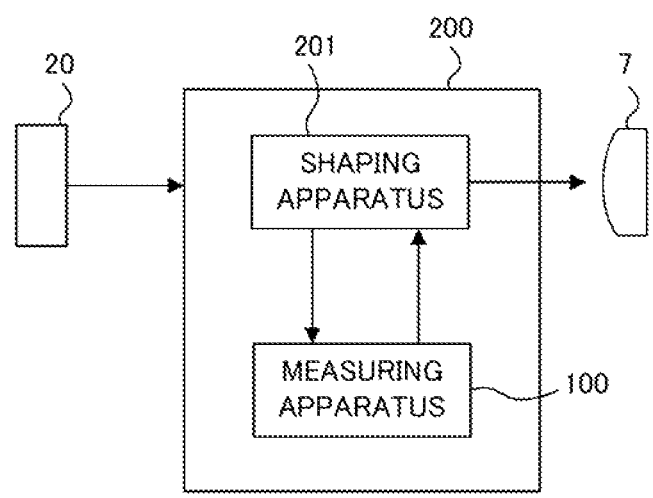
FIG. 9 schematically shows a configuration of an optical element producing apparatus that is Embodiment 5 of the present invention.

FIG. 9 shows a configuration of an optical element producing apparatus 200 including the aspheric surface measuring apparatus 100 described in Embodiment 1. The optical element producing apparatus 200 may use the measuring apparatus described in Embodiment 2 or 3 or the measuring apparatus 101 described in Embodiment 4, instead of the measuring apparatus 100 described in Embodiment 1.

In FIG. 9, reference numeral 20 denotes a material of the measurement object lens 7, and reference numeral 201 denotes a shaping apparatus that performs shaping processes on the material 20 such as cutting and polishing to shape the measurement object lens 7 as an optical element.

A surface profile of the measurement object surface 7a of the measurement object lens 7 shaped by the shaping apparatus 201 is measured by using the aspheric surface measuring method described in Embodiment 1 in the aspheric surface measuring apparatus 100. The measuring apparatus 100 calculates, in order to shape the measurement object surface 7a into a target surface profile, a correction shaping amount for the measurement object surface 7a based on a difference between data of the measured profile of the measurement object surface 7a and the data of the target surface profile, and outputs it to the shaping apparatus 201. Thus, the shaping apparatus 201 performs a correction shaping process using the correction shaping amount to complete the measurement object lens 7 having the measurement object surface 7a whose surface profile coincides with the target surface profile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-052422, filed on Mar. 9, 2012, which is hereby incorporated by reference herein in its entirety.

What is claimed is:

1. An aspheric surface measuring method of measuring a profile of a measurement object aspheric surface using output from a light-receiving sensor to which a measurement light projected onto and reflected by the measurement object aspheric surface is introduced through an optical system, the method comprising:
   a step of providing a reference aspheric surface whose profile has been measured;
   a step of calculating (a) a positional magnification distribution of rays of a reference light, which is projected onto and reflected by the reference aspheric surface and is introduced to the light-receiving sensor through the optical system, using a distance on the light-receiving sensor from a position corresponding to an optical axis of the optical system to an incident position of each of the rays and a distance on a sensor conjugate surface from a position corresponding to the optical axis to an incident position of that ray, the sensor conjugate surface being located at a position conjugate with the light-receiving sensor with respect to the optical system and (b) an angular magnification distribution of the rays of the reference light using a change amount of a reflection angle in a meridional plane on the sensor conjugate surface with respect to a tilt of the reference surface and a change amount of an incident angle in a meridional plane on the light-receiving sensor with respect the tilt of the reference surface;
   a step of measuring a first wavefront of the reference light on the light-receiving sensor using the output from the light-receiving sensor;
   a step of calculating a second wavefront of the reference light on the light-receiving sensor using a parameter of the optical system;
   a calibration step of moving at least two movable elements among part of the optical system, the reference aspheric surface and the light-receiving sensor so that a difference between rotationally symmetric components of the first and second wavefronts becomes smaller than a predetermined value;
   a step of measuring, after the calibration step, a third wavefront of the reference light on the light-receiving sensor using the output from the light receiving sensor;
   a step of measuring, after the calibration step, a fourth wavefront of the measurement light on the light-receiving sensor using the output from the light receiving sensor; and
   a step of calculating the profile of the measurement object aspheric surface using the third wavefront, the fourth wavefront, the positional magnification distribution, the angular magnification distribution and the profile of the reference aspheric surface.

2. An aspheric surface measuring method according to claim 1, wherein the calibration step selects, among the part of the optical system, the reference aspheric surface and the light-receiving sensor, the two movable elements whose each movement changes a frequency component of a difference between the rotationally symmetric components of the first wavefront before and after the movement thereof.

3. An aspheric surface measuring method according to claim 1, wherein the calibration step selects, among the part of the optical system, the reference aspheric surface and the light-receiving sensor, the two movable elements whose each movement provides a larger difference between the rotationally symmetric components of the first wavefront before and after the movement thereof than that provided by movement of the other one.

4. An aspheric surface measuring method according to claim 1, wherein the calibration step calculates a difference between wavefronts before and after the movement of the movable elements, and calculates a movement amount of each of the movable elements from the calculated difference.

5. An aspheric surface measuring apparatus for measuring a profile of a measurement object aspheric surface, the apparatus comprising:
   an optical system;
   a light-receiving sensor to which a measurement light projected onto and reflected by the measurement object aspheric surface is introduced through the optical system;
   a magnification distribution calculating device configured to calculate, using a reference aspheric surface whose profile has been measured, (a) a positional magnification distribution of rays of a reference light, which is projected onto and reflected by the reference aspheric surface and is introduced to the light-receiving sensor through the optical system, using a distance on the light-receiving sensor from a position corresponding to an optical axis of the optical system to an incident position of each of the rays and a distance on a sensor conjugate surface from a position corresponding to the optical axis to an incident position of that ray, the sensor conjugate surface being located at a position conjugate with the light-receiving sensor with respect to the optical system and (b) an angular magnification distribution of the rays of the reference light using a change amount of a reflection angle in a meridional plane on the sensor conjugate surface with respect to a tilt of the reference surface and a change amount of an incident angle in a meridional plane on the light-receiving sensor with respect the tilt of the reference;
   a wavefront measuring device configured to measure a first wavefront of the reference light on the light-receiving sensor using output from the light receiving sensor;

a wavefront calculating device configured to calculate a second wavefront of the reference light on the light-receiving sensor using a parameter of the optical system; and a calibrating device configured to perform a calibration process to move at least two movable elements among part of the optical system, the reference aspheric surface and the light-receiving sensor so that a difference between rotationally symmetric components of the first and second wavefronts becomes smaller than a predetermined value, wherein the wavefront measuring device is configured to measure, after the calibration process, using output from the light receiving sensor, a third wavefront of the reference light on the light-receiving sensor and a fourth wavefront of the measurement light on the light-receiving sensor; and a profile calculating device configured to calculate the profile of the measurement object aspheric surface using the third wavefront, the fourth wavefront, the positional magnification distribution, the angular magnification distribution and the profile of the reference aspheric surface.

6. An optical element producing apparatus comprising:

a shaping apparatus configured to shape an optical element; and a measuring apparatus for measuring a profile of a measurement object aspheric surface of the optical element by an aspheric surface, the measuring apparatus comprising:

an optical system;

a light-receiving sensor to which a measurement light projected onto and reflected by the measurement object aspheric surface is introduced through the optical system;

a magnification distribution calculating device configured to calculate, using a reference aspheric surface whose profile has been measured, (a) a positional magnification distribution of rays of a reference light, which is projected onto and reflected by the reference aspheric surface and is introduced to the light-receiving sensor through the optical system, using a distance on the light-receiving sensor from a position corresponding to an optical axis of the optical system to an incident position of each of the rays and a distance on a sensor conjugate surface from a position corresponding to the optical axis to an incident position of that ray, the sensor conjugate surface being located at a position conjugate with the light-receiving sensor with respect to the optical system and (b) an angular magnification distribution of the rays of the reference light using a change amount of a reflection angle in a meridional plane on the sensor conjugate surface with respect to a tilt of the reference surface and a change amount of an incident angle in a meridional plane on the light-receiving sensor with respect the tilt of the reference surface;

a wavefront measuring device configured to measure a first wavefront of the reference light on the light-receiving sensor using the output from the light-receiving sensor;

a wavefront calculating device configured to calculate a second wavefront of the reference light on the light-receiving sensor using a parameter of the optical system; and a calibration device configured to perform a calibrating process to move at least two movable elements among part of the optical system, the reference aspheric surface and the light-receiving sensor so that a difference between rotationally symmetric components of the first and second wavefronts becomes smaller than a predetermined value, wherein the wavefront measuring device is configured to measure, after the calibration process, using output from the light receiving sensor, a third wavefront of the reference light on the light-receiving sensor and a fourth wavefront of the measurement light on the light-receiving sensor using the output from the light receiving sensor; and a profile calculating device configured to calculate the profile of the measurement object aspheric surface using the third wavefront, the fourth wavefront, the positional magnification distribution, the angular magnification distribution, and the profile of the reference aspheric surface.

7. An optical element comprising:

a body of the optical element; and an aspheric surface formed on the body, wherein the optical element is produced using the optical element producing apparatus according to claim 6.

\* \* \* \* \*